US009333856B2

(12) United States Patent
Cheng et al.

(10) Patent No.: US 9,333,856 B2
(45) Date of Patent: May 10, 2016

(54) DEVICE AND METHOD FOR CONTROLLING POWER TO A VEHICULAR DIFFERENTIAL SPEED CONTROLLER

(71) Applicant: Kwang Yang Motor Co., Ltd., Kaohsiung (TW)

(72) Inventors: Wei-Jen Cheng, Kaohsiung (TW); Shih-Chia Hsieh, Kaohsiung (TW); Te-Feng Chen, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 14/556,581

(22) Filed: Dec. 1, 2014

(65) Prior Publication Data
US 2015/0183320 A1 Jul. 2, 2015

(30) Foreign Application Priority Data

Jan. 2, 2014 (TW) .................................. 103100017

(51) Int. Cl.
| | |
|---|---|
| *B60K 23/04* | (2006.01) |
| *F16H 48/20* | (2012.01) |
| *B60W 10/16* | (2012.01) |
| *B60W 10/18* | (2012.01) |
| *B60W 30/18* | (2012.01) |

(52) U.S. Cl.
CPC ............. *B60K 23/04* (2013.01); *B60W 10/16* (2013.01); *B60W 10/182* (2013.01); *B60W 30/18118* (2013.01); *F16H 48/20* (2013.01); *B60K 2023/046* (2013.01); *F16H 2048/204* (2013.01)

(58) Field of Classification Search
None
See application file for complete search history.

(56) References Cited

U.S. PATENT DOCUMENTS

| | | | |
|---|---|---|---|
| 2010/0210417 A1* | 8/2010 | Lin .......................... | B60T 7/104 477/194 |
| 2011/0278108 A1* | 11/2011 | Watanabe ............... | B60T 7/042 188/72.3 |
| 2012/0152637 A1* | 6/2012 | Hapka .................... | B60K 23/04 180/233 |

* cited by examiner

*Primary Examiner* — Edwin A Young
(74) *Attorney, Agent, or Firm* — Huffman Law Group, PC (57) ABSTRACT

A device for controlling power to a vehicular differential speed controller is applied to control a differential speed controller inside a vehicle, and has an input voltage regulation circuit, a trigger circuit, a driving circuit and a relay. The input voltage regulation circuit converts an input voltage into an operating voltage and supplies the operating voltage to the trigger circuit. The trigger circuit generates a trigger signal after receiving a parking brake signal, such that the driving circuit activates the relay according to the trigger signal and supplies an output voltage to the differential speed controller. Accordingly, the present invention can automatically provide a sufficient power supply time to the differential speed controller to switch an operation state of a vehicle differential to a locked state when the vehicle power is switched off and the parking brake is activated.

10 Claims, 7 Drawing Sheets

DEVICE AND METHOD FOR CONTROLLING POWER TO A VEHICULAR DIFFERENTIAL SPEED CONTROLLER

BACKGROUND OF THE INVENTION

1. Field of the Invention

The present invention relates to a device and a method for controlling power to a vehicular differential speed controller and, more particularly, to a device and a method for maintaining power to a vehicular differential speed controller according to a parking brake signal.

2. Description of the Related Art

Figure 7:
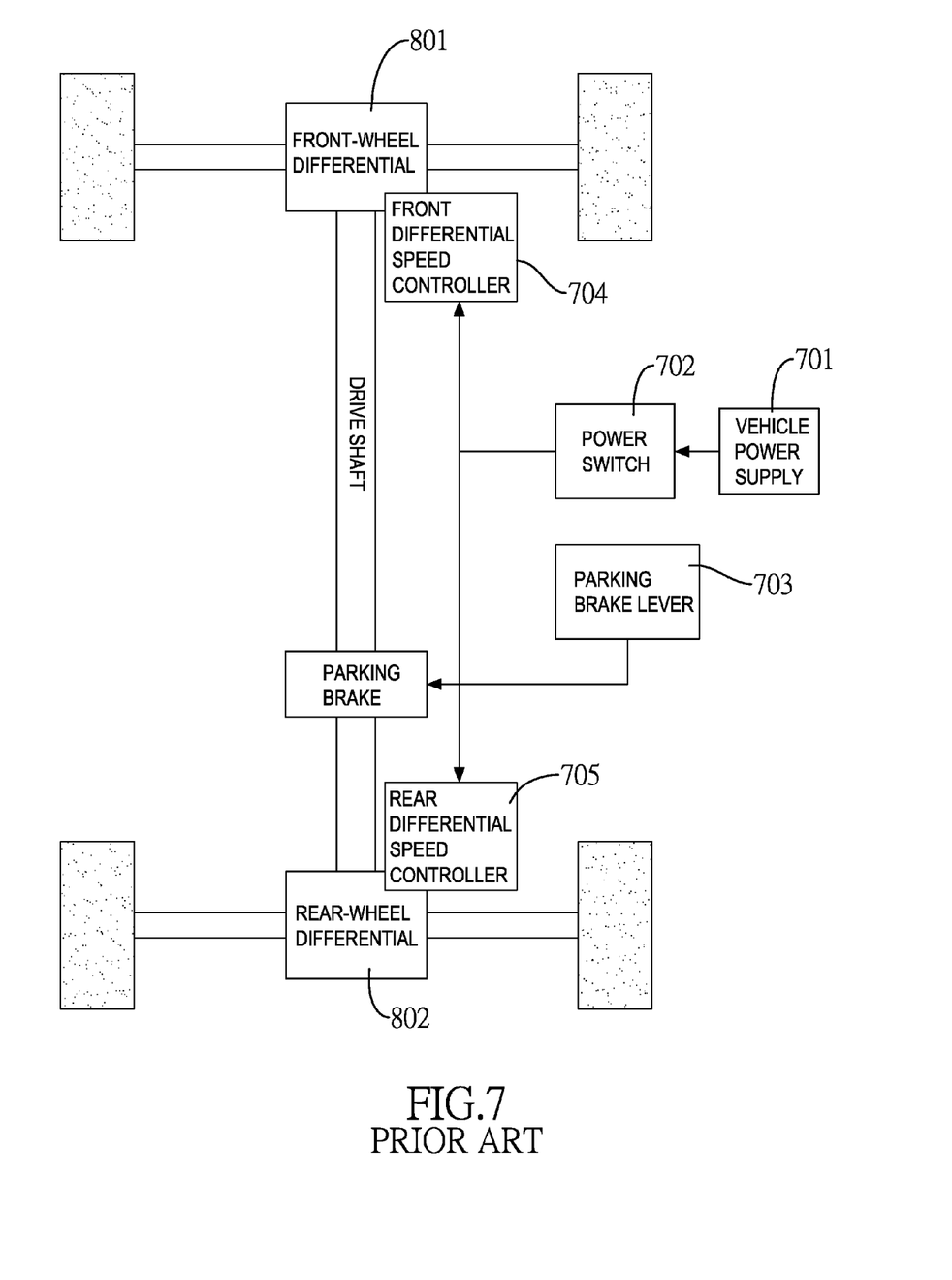
FIG. 7 is a functional block diagram of a conventional control system for vehicular differential speed controller.

With reference to FIG. 7, for a vehicle equipped with differentials, such as an all-terrain vehicle, a front-wheel differential 801 and a rear-wheel differential 802 are provided and respectively controlled by a front differential speed controller 704 and a rear differential speed controller 705 at an unlocked state or a locked state.

When the front-wheel differential 801 and the rear-wheel differential 802 are at the unlocked state, the wheels on the left and right of the vehicle can be rotated at different speeds. On the other hand, when the front-wheel differential 801 and the rear-wheel differential 802 are at the locked state, the wheels on the left and right of the vehicle can be rotated at a same speed or synchronously rotated.

When the driver parks the vehicle and pulls the parking brake lever 703, the drive shaft connected to the wheels is locked to prevent the drive shaft from rotating. As to the control over the front-wheel differential 801 and the rear-wheel differential 802, the front differential speed controller 704 and the rear differential speed controller 705 acquire operating power from a vehicle power supply through a power switch 702. If the driver switches off the power switch 702, the front differential speed controller 704 and the rear differential speed controller immediately stop operation and are kept at the last operating state thereof before the power switch 702 is switched off. Hence, the front-wheel differential 201 and the rear-wheel differential 802 may still be maintained at the unlocked state.

As a result of the unlocked state of the front-wheel differential 801 and the rear-wheel differential 802, the wheels on the right and left of the vehicle can still be rotated. Under the circumstance of certain particular terrains, such as sloped hill, although the parking brake is pulled and the drive shaft is locked, the vehicle may be put in peril of accident due to vehicle movement arising from the rotating wheels.

SUMMARY OF THE INVENTION

An objective of the present invention is to provide a device and a method for controlling power to a vehicular differential speed controller ensuring that a vehicular differential stays at a locked state after the vehicle power is switched off.

To achieve the foregoing objective, the device for controlling power to vehicular differential speed controller has an input voltage pin, an output voltage pin, an input voltage regulation circuit, a trigger circuit, a driving circuit and a relay.

The input voltage pin is adapted to connect to a vehicle power supply of a vehicle to receive an input voltage.

The output voltage pin is adapted to connect to at least one differential speed controller.

The input voltage regulation circuit is connected to the input voltage pin to receive the input voltage and convert the input voltage into an operating voltage.

The trigger circuit is connected to the input voltage regulation circuit, receives the operating voltage and a parking brake signal generated by activating a parking brake of the vehicle, and outputs a trigger signal lasting for a preset time upon receiving the parking brake signal.

The driving circuit is connected to the trigger circuit to receive the trigger signal and a power switch signal from the vehicle, and outputs a driving signal when receiving any one of the power switch signal and the trigger signal.

The relay is connected between the input voltage pin and the output voltage pin, is connected to the driving circuit to receive the driving signal, and is controlled by the driving signal to be activated for the output voltage pin to output a voltage to the at least one differential speed controller.

To achieve the foregoing objective, the method for controlling power to a vehicular differential speed controller has steps of:

detecting a switching state of a power switch, wherein when the power switch has been switched off, stopping supplying an output voltage to a differential speed controller;

detecting an activation state of a parking brake, wherein after the power switch is switched off, determining if the parking brake has been activated to generate a parking brake signal;

generating a trigger signal, wherein after the parking brake signal is detected, generating the trigger signal lasting for a preset time; and restoring supply of the output voltage, wherein during the preset time, restoring supply of the output voltage to the differential speed controller to resume operation of the differential speed controller in the preset time and change an operation state of the differential speed controller to a locked state.

Given the foregoing device and method, when a driver switches off the vehicle power and activates the parking brake, the parking brake signal activates the trigger circuit to generate a trigger signal for the driving circuit to activate the relay within a short period of time according to the trigger signal. During the activation time of the relay, the device supplies the output voltage to the differential speed controller for the differential speed controller to have enough time to switch an operation state of a corresponding vehicular differential to a locked state, thereby preventing wheels on the left and right sides of the vehicle from being asynchronously rotated.

Other objectives, advantages and novel features of the invention will become more apparent from the following detailed description when taken in conjunction with the accompanying drawings.

DETAILED DESCRIPTION OF THE INVENTION

Figure 1:
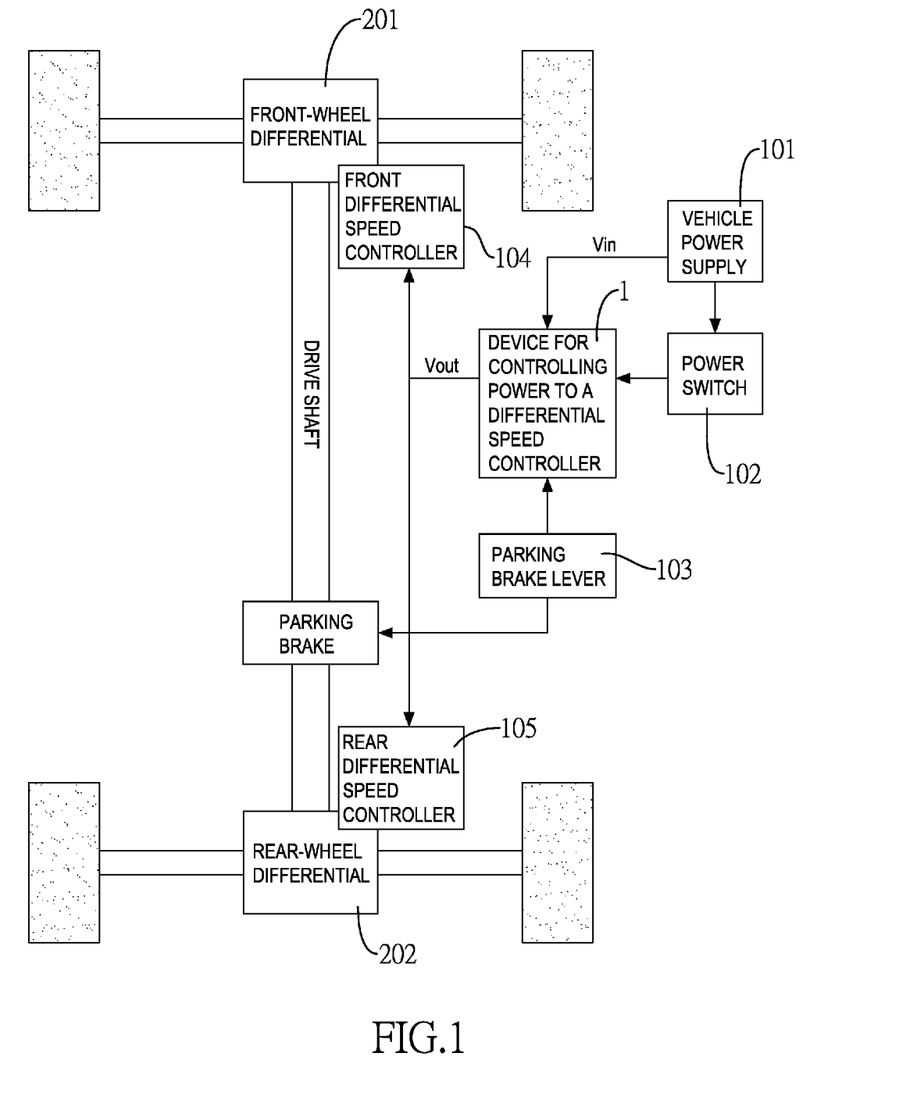
FIG. 1 is a functional block diagram of a device for controlling power to a vehicular differential speed controller in accordance with the present invention applied to a vehicular control system.

With reference to FIG. 1, a device 1 for controlling power to a differential speed controller in accordance with the present invention is connected to a vehicle power supply 101, a power switch 102, a parking brake lever 103 and at least one differential speed controller. In the present embodiment, the at least one differential speed controller includes a front differential speed controller 104 and a rear differential speed controller 105.

Figure 2:
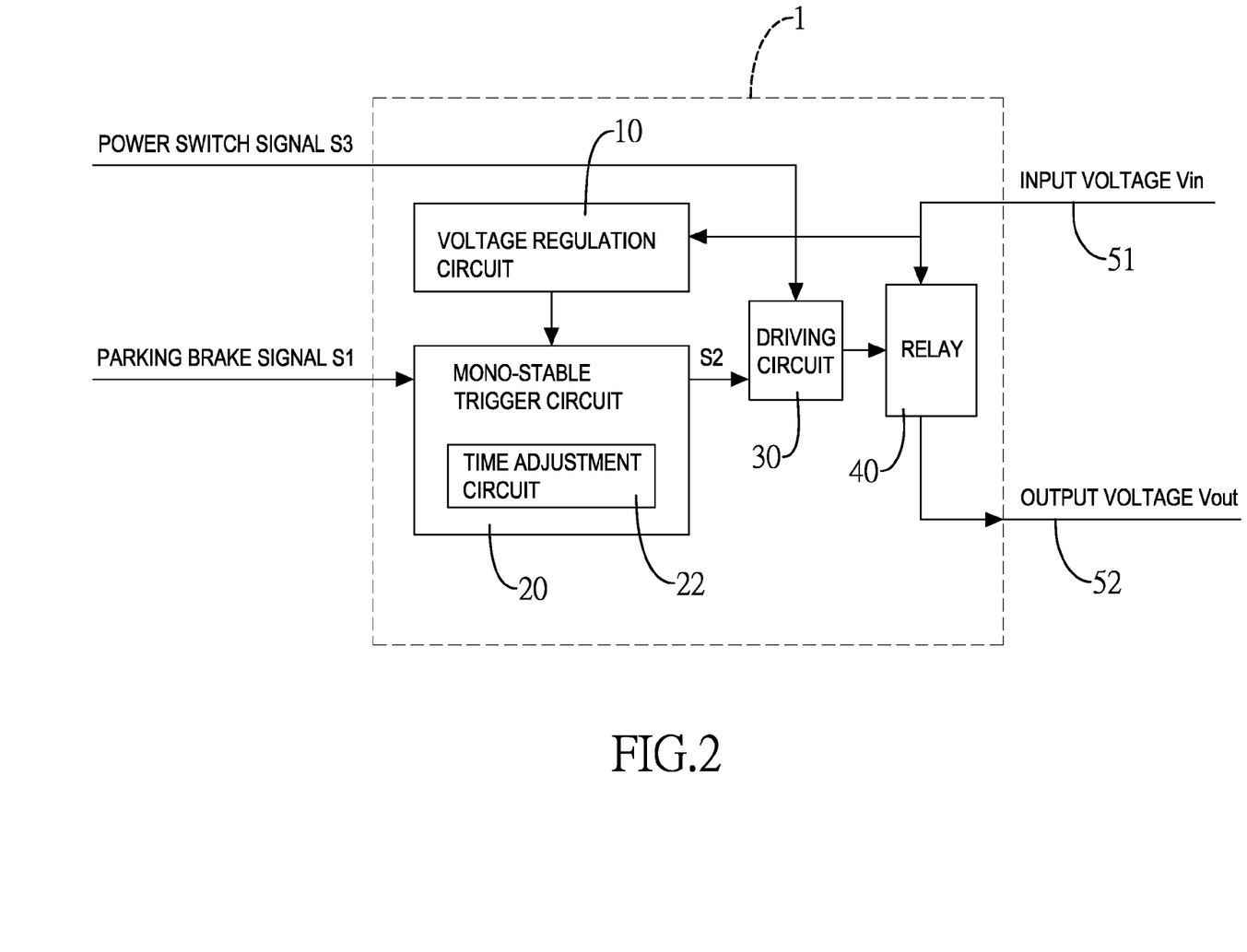
FIG. 2 is a circuit block diagram of the device for controlling power to a vehicular differential speed controller in FIG. 1.

With reference to FIG. 2, the device 1 for controlling power to a differential speed controller has an input voltage regulation circuit 10, a trigger circuit 20, a driving circuit 30 and a relay 40. A pin out of the device 1 includes an input voltage pin 51 and an output voltage pin 52. The input voltage pin 51 is connected to the vehicle power supply 101. The output voltage pin 52 is connected to the front differential speed controller 104 and the rear differential speed controller 105. The vehicle power supply 101 is usually a battery providing DC power with a DC (Direct Current) input voltage Vin.

The input voltage regulation circuit 10 is connected to the vehicle power supply 101 through the input voltage pin 51 to receive the input voltage Vin and convert the input voltage Vin into an operating power for continuous power supply.

Figure 3:
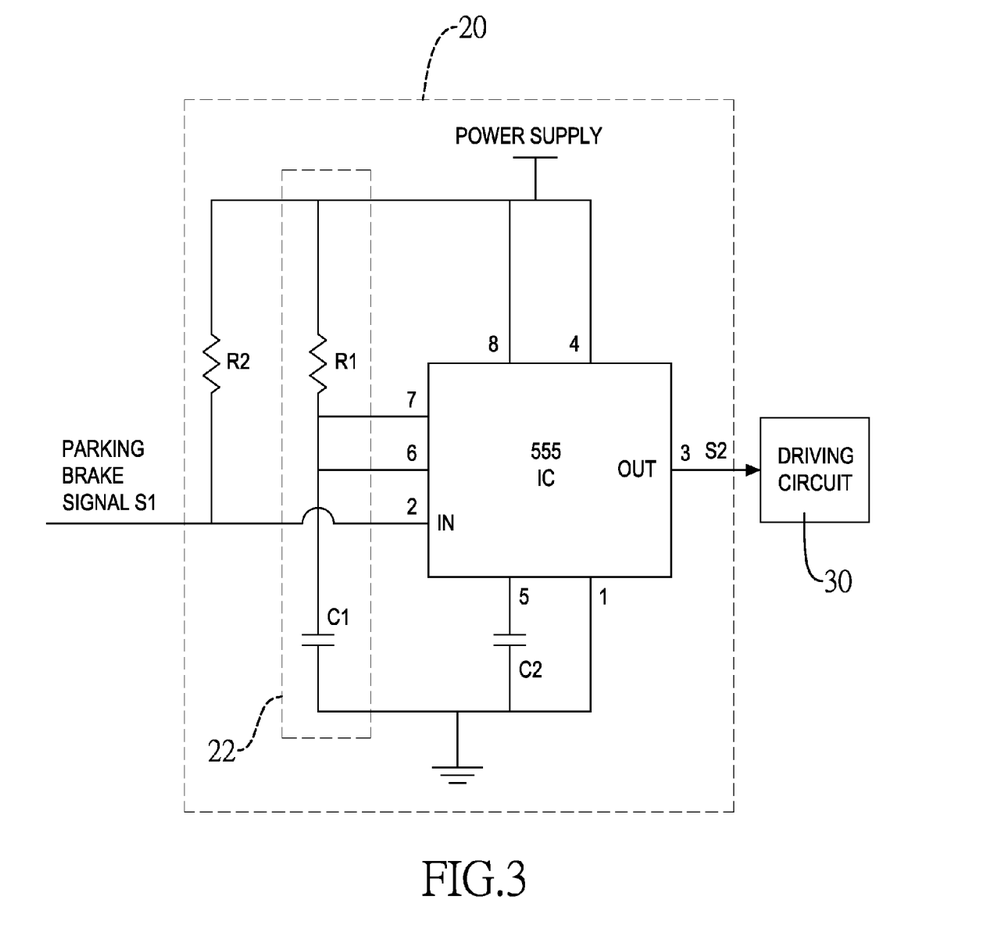
FIG. 3 is a circuit diagram of a trigger circuit of the device for controlling power to a vehicular differential speed controller in FIG. 2.

The trigger circuit 20 is connected to the input voltage regulation circuit 10 to receive the DC operating power and is connected to the parking brake lever 103 to acquire a parking brake signal S1. When the parking brake lever 103 is pulled, a trigger signal S2 is generated and outputted from an output terminal to the driving circuit 30. With reference to FIG. 3, the trigger circuit 20 is a mono-stable trigger circuit having a time adjustment circuit 22 for setting a preset time. When receiving the parking brake signal S1, the mono-stable trigger circuit changes an output voltage level, such as changing an original low-level signal to a high-level signal lasting for the preset time. The mono-stable trigger circuit may be formed by a 555 IC (Integrated Circuit). One of the input terminals serves to receive the parking brake signal S1, and another two of the input terminals are connected to an RC circuit formed by a resistor R1 and a capacitor C1 connected in series with each other. The RC circuit serves as the time adjustment circuit 22, and values of the resistor R1 and the capacitor C1 can be adjusted to change the preset time.

Figure 4:
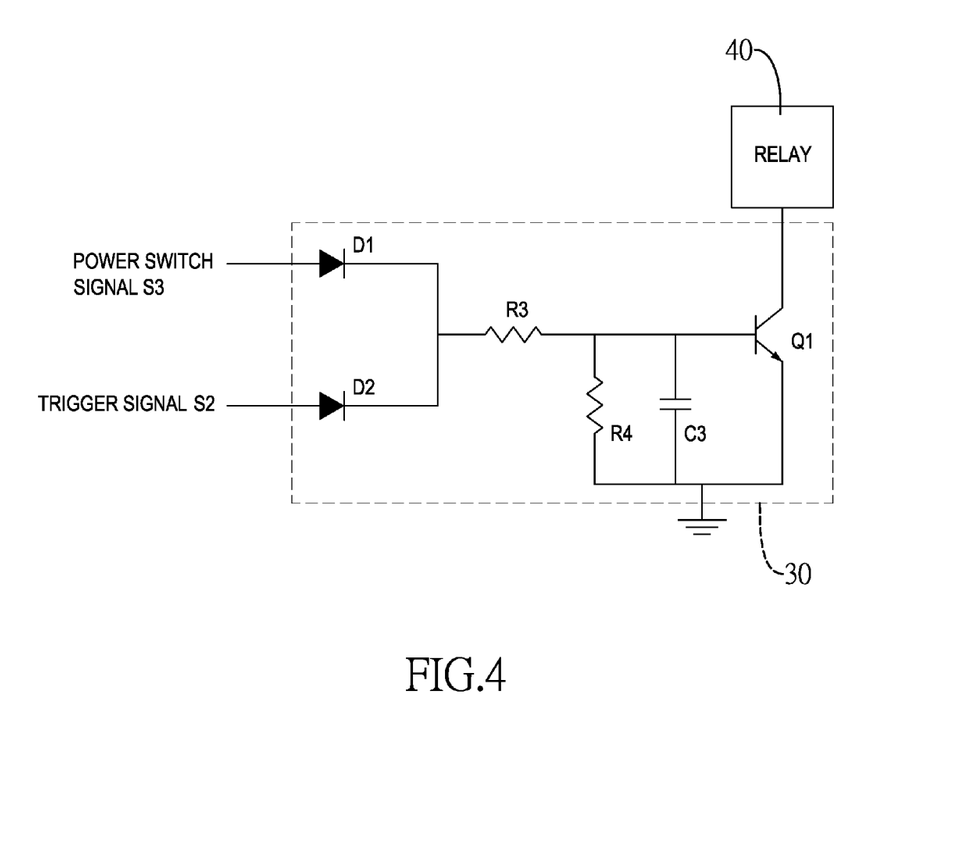
FIG. 4 is a circuit diagram of a driving circuit of the device for controlling power to a vehicular differential speed controller in FIG. 2.

With reference to FIG. 4, the driving circuit 30 has two input terminals to respectively receive the trigger signal S2 from the trigger circuit 20 and a power switch signal S3 from the power switch 102. An output terminal of the driving circuit 30 is connected to the relay 40 to output a driving signal to activate or deactivate the relay 40. When there is none of the power switch signal S3 and the trigger signal S2, the driving circuit 30 deactivates the relay 40. When one of the power switch signal S3 and the trigger signal S2 is present, the driving circuit 30 activates the relay 40.

The relay 40 is connected in series between the input voltage pin 51 and the output voltage pin 52. When the relay 40 is activated according to the availability of the power switch signal S3 and the trigger signal S2, the input voltage Vin supplied by the vehicle power supply 101 passes through the relay 40 to supply an output voltage Vout through the output voltage pin 52. Conversely, when the relay 40 is deactivated, the output voltage pin 52 outputs no power.

Figure 5:
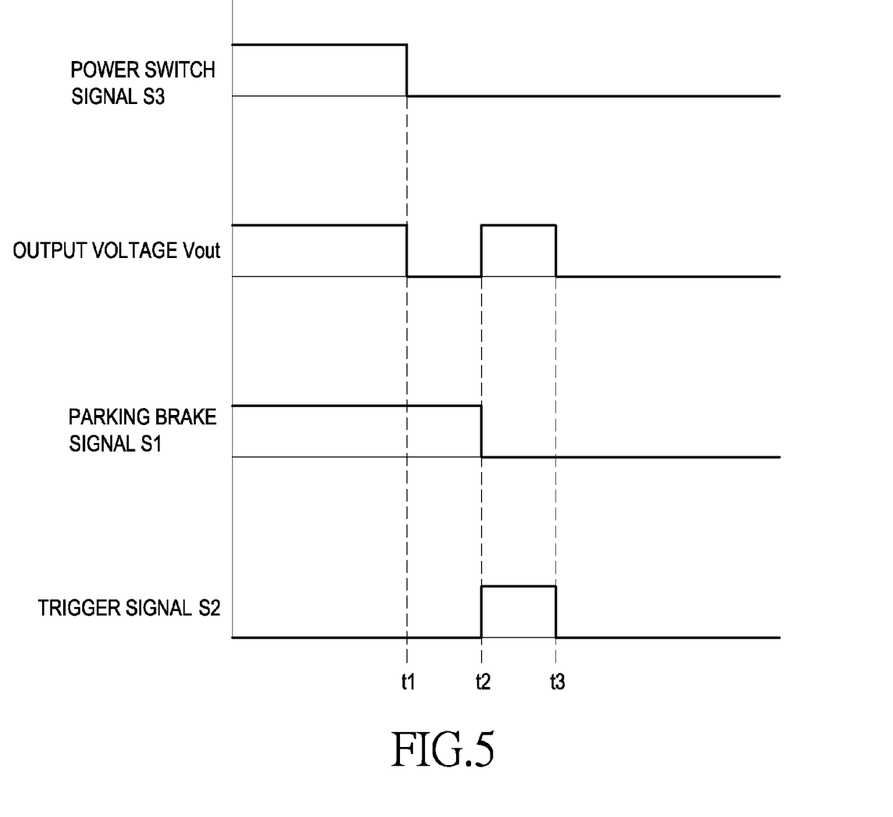
FIG. 5 includes multiple waveforms associated with signals of a power switch, output voltage, a parking brake and the trigger circuit in FIG. 2.

With reference to FIGS. 1 and 5, when the vehicle is travelling and the power switch 102 is switched on, a high-level power switch signal S3 can be received, such that the relay 40 is activated and the output voltage pin 52 can continuously supply the output voltage Vout for the front differential speed controller 104 and the rear differential speed controller 105 to normally operate.

When the vehicle is stopped, the driver switches off the power switch (such as at time t1), the power switch signal drops from a high-level signal to a low-level signal. In turn, the driving circuit 30 does not send out the driving signal to the relay 40 and the relay 40 is therefore deactivated. Hence, there is no output voltage Vout.

When the driver further pulls up the parking brake lever 103, the parking brake signal S1 is changed from a high-level signal to low-level signal (such as at time t2), the trigger circuit 30 immediately changes the trigger signal S2 from a low-level signal to a high-level signal and keeps the trigger signal S2 staying at the high level for the preset time from t2 to t3. During the preset time, the driving circuit 30 outputs the driving signal to the relay 40, such that the relay 40 is once again activated during the preset time from t2 to t3 and the output voltage Vout is supplied again during the preset time. As such, the front differential speed controller 104 and the rear differential speed controller 105 can acquire sufficient power during the preset time from t2 to t3 to control a front-wheel differential 201 and a rear-wheel differential 202 of the vehicle to enter a locked state.

Figure 6:
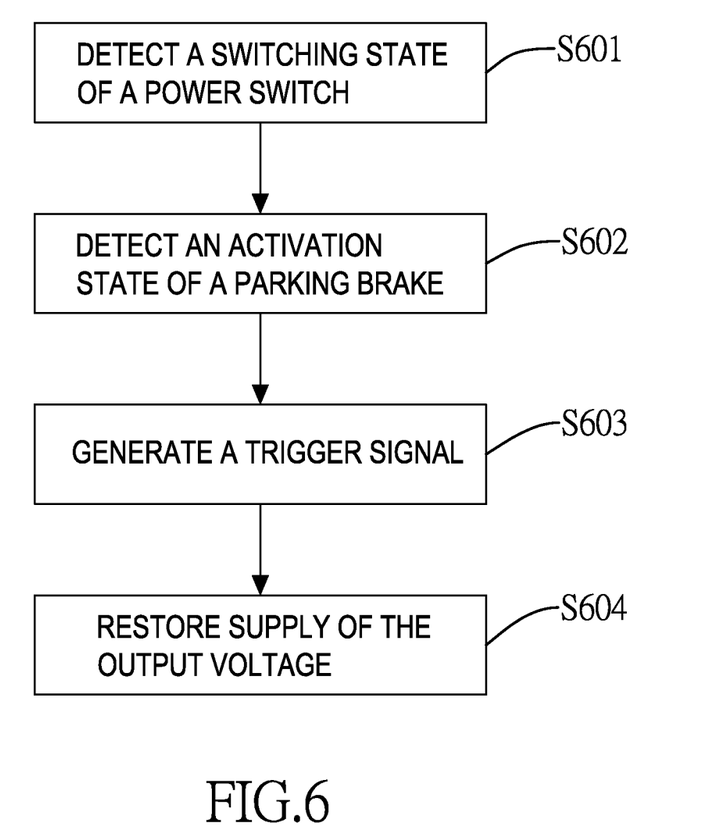
FIG. 6 is a flow chart of a method for controlling power to a vehicular differential speed controller in accordance with the present invention.

With reference to FIG. 6, a method for controlling power to a vehicular differential speed controller in accordance with the present invention has the following steps.

Step S601: Detect a switching state of a power switch. If the power switch has been switched off, stop supplying an output voltage to a front differential speed controller 104 and a rear differential speed controller 105.

Step S602: Detect an activation state of a parking brake. After the power switch is switched off, determine if the parking brake has been activated to generate a parking brake signal.

Step S603: Generate a trigger signal. After the parking brake signal is detected, generate the trigger signal lasting for a preset time.

Step S604: Restore supply of the output voltage. During the preset time, restore supply of the output voltage to the front differential speed controller 104 and the rear differential speed controller 105 to resume operation of the front differential speed controller 104 and the rear differential speed controller 105 and change an operation state of each of the front differential speed controller 104 and the rear differential speed controller 105 to a locked state in the preset time.

In sum, the device 1 for controlling power to a vehicular differential speed controller can supply power to the front differential speed controller 104 and the rear differential speed controller 105 within a short preset time when the driver switches off the vehicle power supply and activates the parking brake, such that the front-wheel differential 201 and the rear-wheel differential 202 have enough time to switch to the locked state, thereby preventing asynchronous rotation of the wheels.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A device for controlling power to a vehicular differential speed controller, comprising:
   an input voltage pin adapted to connect to a vehicle power supply of a vehicle to receive an input voltage;
   an output voltage pin adapted to connect to at least one differential speed controller;
   an input voltage regulation circuit connected to the input voltage pin to receive the input voltage and convert the input voltage into an operating voltage;
   a trigger circuit connected to the input voltage regulation circuit, receiving the operating voltage and a parking brake signal generated by activating a parking brake lever of the vehicle, and outputting a trigger signal lasting for a preset time upon receiving the parking brake signal;
   a driving circuit connected to the trigger circuit to receive the trigger signal and a power switch signal from the vehicle, and outputting a driving signal when receiving any one of the power switch signal and the trigger signal; and
   a relay connected between the input voltage pin and the output voltage pin, connected to the driving circuit to receive the driving signal, and controlled by the driving signal to be activated for the output voltage pin to output a voltage to the at least one differential speed controller.

2. The device as claimed in claim 1, wherein the trigger circuit has a time adjustment circuit for setting the preset time.

3. The device as claimed in claim 2, wherein the trigger circuit is a mono-stable trigger circuit outputting the trigger signal with a high level within the preset time.

4. The device as claimed in claim 3, wherein the time adjustment circuit is a RC circuit formed by a resistor and a capacitor connected in series with each other.

5. The device as claimed in claim 4, wherein when the driving circuit receives none of the power switch signal and the trigger signal, the relay is deactivated by the driving signal from the driving circuit.

6. The device as claimed in claim 3, wherein when the driving circuit receives none of the power switch signal and the trigger signal, the relay is deactivated by the driving signal from the driving circuit.

7. The device as claimed in claim 3, wherein the output voltage pin is connected to a front differential speed controller and a rear differential speed controller of the vehicle.

8. The device as claimed in claim 2, wherein when the driving circuit receives none of the power switch signal and the trigger signal, the relay is deactivated by the driving signal from the driving circuit.

9. The device as claimed in claim 1, wherein when the driving circuit receives none of the power switch signal and the trigger signal, the relay is deactivated by the driving signal from the driving circuit.

10. A method for controlling power to a differential speed controller, comprising steps of:
    detecting a switching state of a power switch, wherein when the power switch has been switched off, stopping supplying an output voltage to a differential speed controller;
    detecting an activation state of a parking brake, wherein after the power switch is switched off, determining if the parking brake has been activated to generate a parking brake signal;
    generating a trigger signal, wherein after the parking brake signal is detected, generating the trigger signal lasting for a preset time; and
    restoring supply of the output voltage, wherein during the preset time, restoring supply of the output voltage to the differential speed controller to resume operation of the differential speed controller in the preset time and change an operation state of the differential speed controller to a locked state.

* * * * *